United States Patent [19]

Hanai

[11] Patent Number: 5,464,233

[45] Date of Patent: Nov. 7, 1995

[54] FINGER CHUCK FOR USE WITH MACHINE TOOL

[75] Inventor: Teruo Hanai, Nagoya, Japan

[73] Assignee: Howa Machinery Ltd., Nagoya, Japan

[21] Appl. No.: 204,734

[22] Filed: Mar. 2, 1994

[30] Foreign Application Priority Data

Mar. 8, 1993 [JP] Japan ................... 5-075412

[51] Int. Cl.[6] ..................................... B23B 31/18
[52] U.S. Cl. .......................... 279/137; 279/106; 279/141
[58] Field of Search ................................. 279/106, 133, 279/137, 141, 132

[56] References Cited

U.S. PATENT DOCUMENTS

| 3,044,791 | 7/1962 | Nicosia et al. | 279/106 |
|---|---|---|---|
| 3,420,538 | 1/1969 | Benjamin et al. | 279/106 |
| 3,604,717 | 9/1971 | Hohwart | 279/137 |

FOREIGN PATENT DOCUMENTS

| 361244402 | 10/1986 | Japan | 279/106 |
|---|---|---|---|
| 64-3606 | 1/1989 | Japan . | |
| 401199709 | 8/1989 | Japan | 279/132 |
| 5-293704 | 11/1993 | Japan . | |

Primary Examiner—Steven C. Bishop
Attorney, Agent, or Firm—Ladas & Parry

[57] ABSTRACT

A finger chuck for use with a machine tool comprises a chuck main body having a front wall and a rear wall, the front wall and the rear wall defining a space therebetween. A centering device is supported by the front wall for centering the workpiece on the axis of the chuck main body. Jaws are supported by the front wall for holding the workpiece. A rearwardly protruding portion is provided on the front wall toward the rear wall within the space, and a cavity is defined in the protruding portion so as to open in the front surface of the front wall, the cavity accommodating at least part of the centering device. A drawing member extends through the rear wall in the axial direction, and is shifted by a drive source in the axial direction. A guide portion is disposed in the space integrally with the drawing member, so as to be guided on the protruding portion in the axial direction. A seat surface is formed around the guide portion, and a spider is supported on the seat surface for movement therealong. Axial movement of the drawing member causes opening and closing movements of the jaws through the spider. The distance of the workpiece mounting surface from the front wall is shortened so that the mechanical rigidity of the chuck is increased and its overall thickness is reduced with effective utilization of the interior space of the chuck.

16 Claims, 8 Drawing Sheets

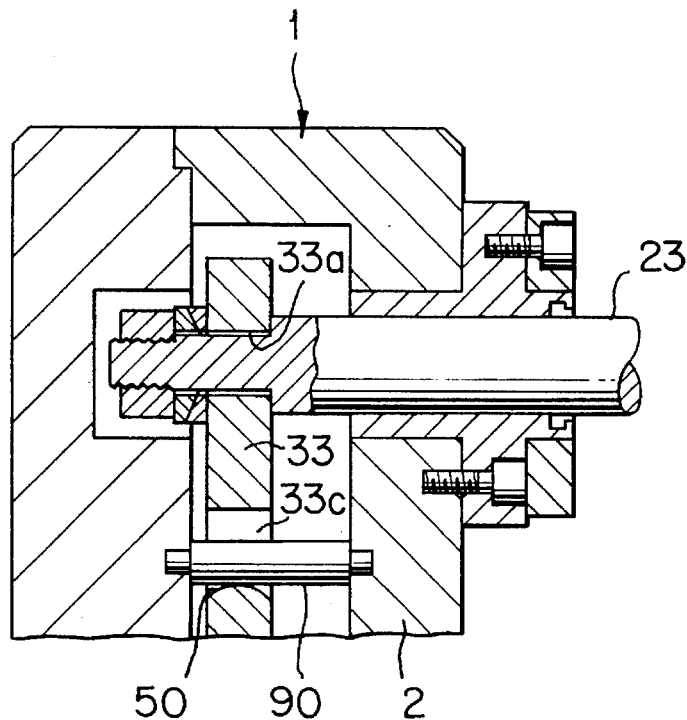
F I G. 6
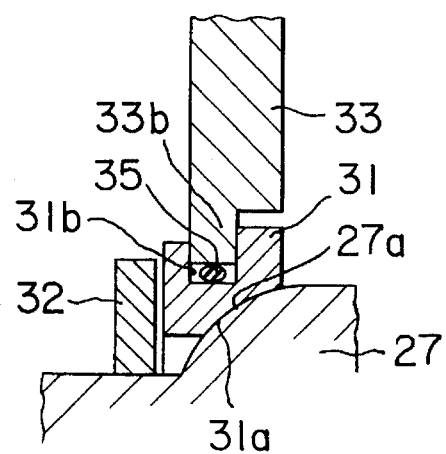
F I G. 7

FINGER CHUCK FOR USE WITH MACHINE TOOL

BACKGROUND OF THE INVENTION

1. Field of the Invention

The present invention relates to a machine tool finger chuck having a centering device for centering a workpiece and a plurality of jaws for holding an outer peripheral portion of the workpiece, and in particular, to a technology for improving the mechanical rigidity of a chuck main body.

2. Description of the Related Art

In a conventional finger chuck, a plate-shaped front wall is disposed in front of a chuck main body. A centering device that centers a workpiece is disposed at a center portion of the front wall. A plurality of jaws that hold the workpiece are disposed in an outer peripheral portion of the front wall. A drawing member opens and closes the jaws through a spider and a rod. In the conventional finger chuck, the entire centering device protrudes from the front surface of the front wall. Thus, the distance from the front surface of the chuck main body to the workpiece mounting surface becomes long, thereby lowering the mechanical rigidity of the chuck main body. When the chuck main body rotates at high speed, a workpiece tends to vibrate, thereby lowering machining surface accuracy. A related art reference, for example, Japanese Utility Model Publication No. 64-3606 published Jan. 31, 1989 teaches a chuck main body with a centering device disposed in a cavity thereof. In this case, since the axial thickness of the chuck main body is large, it is heavy. Thus, the chuck main body cannot rotate at high speed, thereby lowering the throughput.

The conventional finger chuck can hold a workpiece with different wall thicknesses. However, while the chuck main body is holding such a workpiece, the spider is inclined and rotates about the center of an inner spherical surface thereof. In this case, the center of the outer spherical surface, namely the position of the center of gravity, radially moves corresponding to the inclination of the spider.

The product of the amount of movement of the spider and the weight thereof produces a dynamic imbalance in the finger chuck that rotates. The unbalance amount of the finger chuck results in a mechanical vibration thereof. Thus, when a workpiece with a large outer diameter, for example an aluminum wheel, is machined at a high speed, the machining accuracy lowers and the service life of the spindle bearing shortens. Consequently, the movement of the center of gravity cannot be ignored.

SUMMARY OF THE INVENTION

A first object of the present invention is to provide a finger chuck wherein the distance from a front surface of a chuck main body to a workpiece mounting surface is short and wherein the thickness of the chuck main body is small so that the chuck body is of light weight and the mechanical rigidity of the chuck main body is improved.

A second object of the present invention is to provide a finger chuck that prohibits a spider from radially moving for compensation, and minimizes the movement of the center of gravity of the spider so as to allow the finger chuck to stably rotate at high speed.

To solve the first object, the present invention provides a finger chuck for use with a machine tool, comprising a chuck main body having a front wall and a rear wall, the front wall being opposed to a workpiece, the rear wall being opposed to the front wall, the front wall and the rear wall defining a space therebetween, centering means supported by the front wall and connected to a center portion of the workpiece for centering the workpiece on an axis of the chuck main body, a plurality of jaws supported by the front wall for holding an outer peripheral portion of the workpiece, a rearwardly protruding means protruding from a center portion of the front wall toward the rear wall within the space, cavity means defined in the protruding means and having an opening on a front surface of the front wall, the cavity means accommodating at least part of the centering means so as to hold the centering device, drawing means piercing the rear wall in the axial direction of the chuck main body, the drawing means being shiftable by a drive source in the axial direction of the chuck main body, a guide means disposed in the space and provided integrally with the drawing means, the guide means being guided by the rearwardly protruding means in the axial direction of the chuck main body, a seat surface formed in the vicinity of the guide means, and a spider supported outside the guide means for movement along the seats surface, wherein the jaws are opened and closed by the drawing means through the spider and the rod.

According to the finger chuck of the present invention, since at least part of the centering means is accommodated in the cavity defined in the front wall of the chuck main body, the distance from the front surface of the chuck main body to the workpiece mounting surface is short, whereby the mechanical rigidity of the chuck main body is improved. Guide means of the drawing means fits on the outer periphery of the protruding means of the front wall. A spherical seat that supports the spider is disposed on an outer periphery of the guide means. The space in the vicinity of the protruding means can be effectively used so as to slide the guide means of the drawing means and the spider in the axial direction of the chuck main body. Thus, although the finger chuck has the protruding means, the thickness of the chuck main body can be relatively reduced.

When the spider, which operates the jaws, is axially pulled outward by the drawing means, the spider inclines corresponding to the wall thickness of a workpiece so that each jaw holds the corresponding portion of the workpiece. In such a manner, the compensating function is obtained.

The spider inclines about the center of the inner spherical surface corresponding to the thickness of the workpiece with which each jaw comes in contact and thereby the center of gravity of the spider shifts. However, radial movement of the spider is prohibited by position limiting means. In addition, while a washer disposed between the outer peripheral surface of the drawing means and the inner peripheral surface of the spider is prohibited from moving in the axial direction, it moves in a radial direction through a seat member. The radial direction is opposite to the direction in which the spider moves. Thus, since the center of gravity of the spider does almost not move, the finger chuck that rotates at high speed can be well balanced.

These and other objects, features and advantages of the present invention will become more apparent in light of the following detailed description of best mode embodiments thereof, as illustrated in the accompanying drawings.

BRIEF DESCRIPTION OF DRAWINGS

FIG. 6 is a sectional view showing a modification of the present invention;

FIG. 7 is a sectional view showing a spindle chuck according to a further modification of the present invention;

DESCRIPTION OF THE PREFERRED EMBODIMENTS

Figure 8:
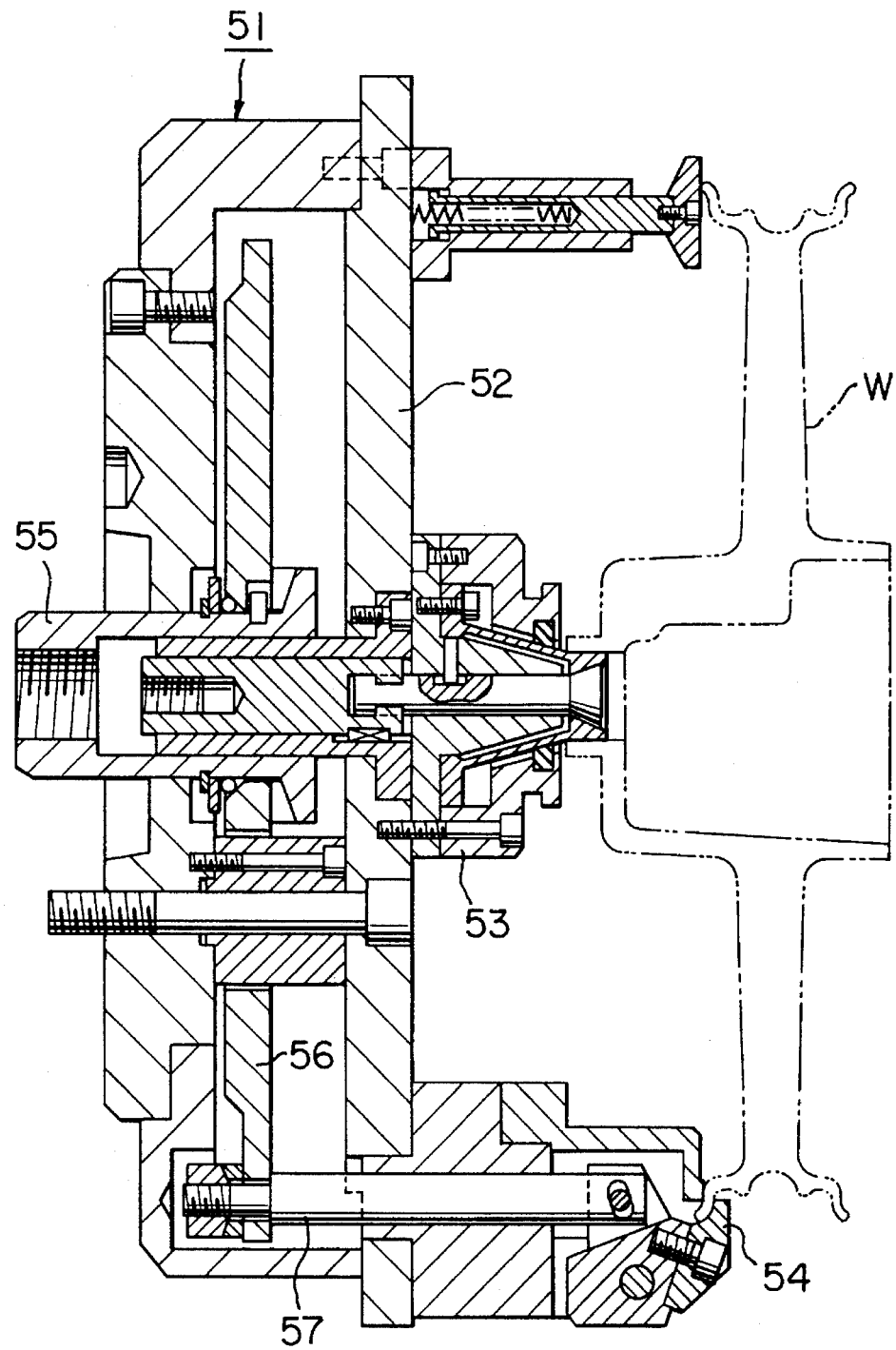
FIG. 8 is a sectional view showing a conventional finger chuck.
Figure 9:
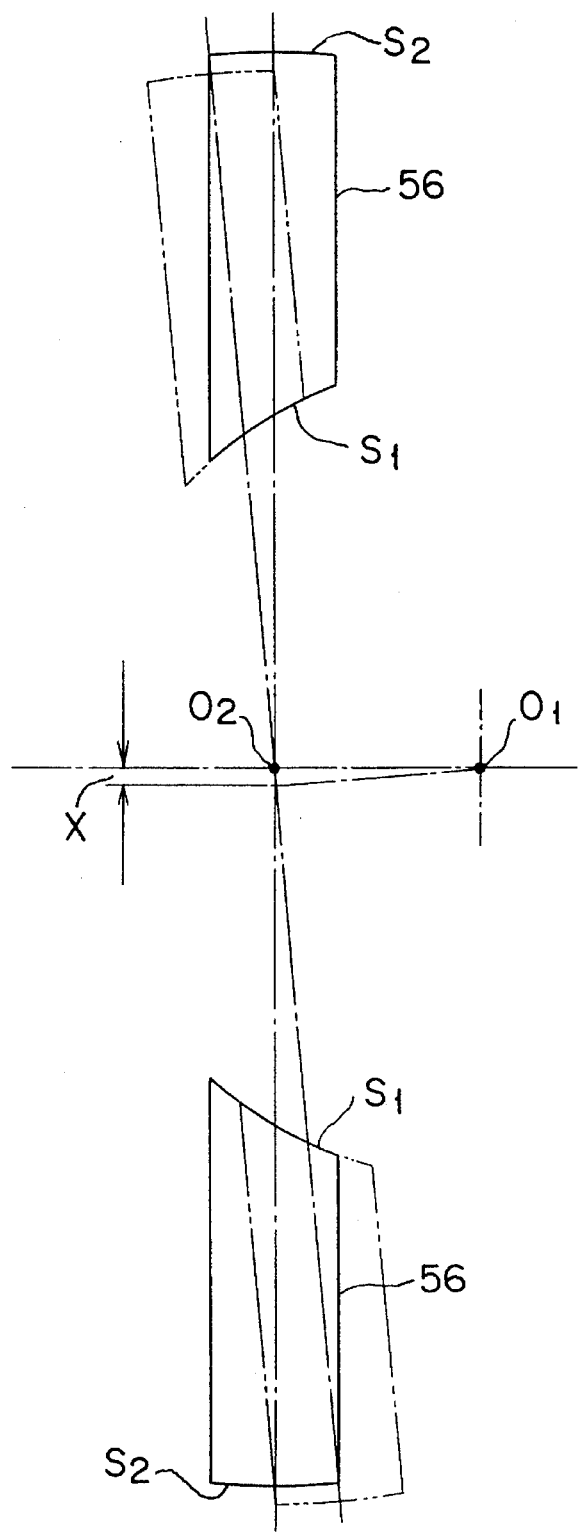
FIG. 9 is a schematic diagram for explaining shifting movement of a center of gravity due to the inclination of a spider for use with the conventional chuck.

Before explaining embodiments of the present invention, with reference to FIGS. 8 and 9, prior art will be first described so that the reader of this specification can easily understand the technical advancement of the present invention.

In a conventional finger chuck, as shown in FIG. 8, a plate-shaped front wall 52 is disposed in front of a chuck main body 51. A centering device 53 that centers a workpiece W is disposed at a center portion of the front wall 52. A plurality of jaws 54 that hold the workpiece W are disposed at outer peripheral portions of the front wall 52. A drawing member 55 opens and closes the jaws 54 through a spider 56 and a rod 57.

In the conventional finger chuck, the entire centering device 53 protrudes from the front surface of the front wall 52. Thus, the distance from the front surface of the chuck main body 51 to the workpiece mounting surface becomes long, thereby lowering the mechanical rigidity of the chuck main body 51. When the chuck main body 51 rotates at high speed, a workpiece W tends to vibrate, thereby lowering machining surface accuracy. Another related art reference, for example, Japanese Utility Model Publication No. 64-3606 published Jan. 31, 1989 teaches a chuck main body with a centering device disposed in a cavity portion thereof. In this case, since the axial thickness of the chuck main body is large, it is heavy. Thus, the chuck main body cannot rotate at high speed, thereby lowering the throughput.

The conventional finger chuck can hold a workpiece with different wall thicknesses. However, while the chuck main body is holding such a workpiece W, the spider 56 is inclined and rotates about the center $O_1$ of an inner spherical surface $S_1$ thereof as shown in FIG. 9. In this case, the center of the outer spherical surface $S_2$, namely the position $O_2$ of the center of gravity, radially moves by a distance X corresponding to the inclination of the spider 56. The product of the amount of movement of the spider 56 and the weight thereof protrudes a dynamic imbalance in the finger chuck that rotates. The unbalance amount of the finger chuck results in a mechanical vibration thereof. Thus, when a workpiece with a large outer diameter, for example an aluminum wheel, is machined at a high speed, the machining accuracy lowers and the service life of the spindle bearing shortens. Consequently, the movement of the center of gravity cannot be ignored.

Next, an embodiment of the present invention that can solve the above-mentioned problems will be described with reference to FIGS. 1 and 2. In these figures, reference numeral 1 denotes a chuck main body of a finger chuck. The chuck main body 1 has a front wall 2, a rear wall 6, and a peripheral wall 4. The front wall 1 is connected to the peripheral wall 4 with bolts 3. The peripheral wall 4 is connected to the rear wall 6 with bolts 5. The chuck main body 1 is connected to a spindle of a machine tool (not shown) with bolts 7 that axially pierces the front wall 2 and the rear wall 6. A rearwardly protruding portion 8 is provided at a center portion of the front wall 2. A cavity portion 9 is defined on the front surface of the front wall 2 so that the cavity portion 9 is opposed to the protruding portion 8. The outer peripheral surface of the protruding portion 8 is formed in a cylindrical surface. The cavity portion 9 is formed as a circular hole that is concentric with the protruding portion 8.

Figure 1:
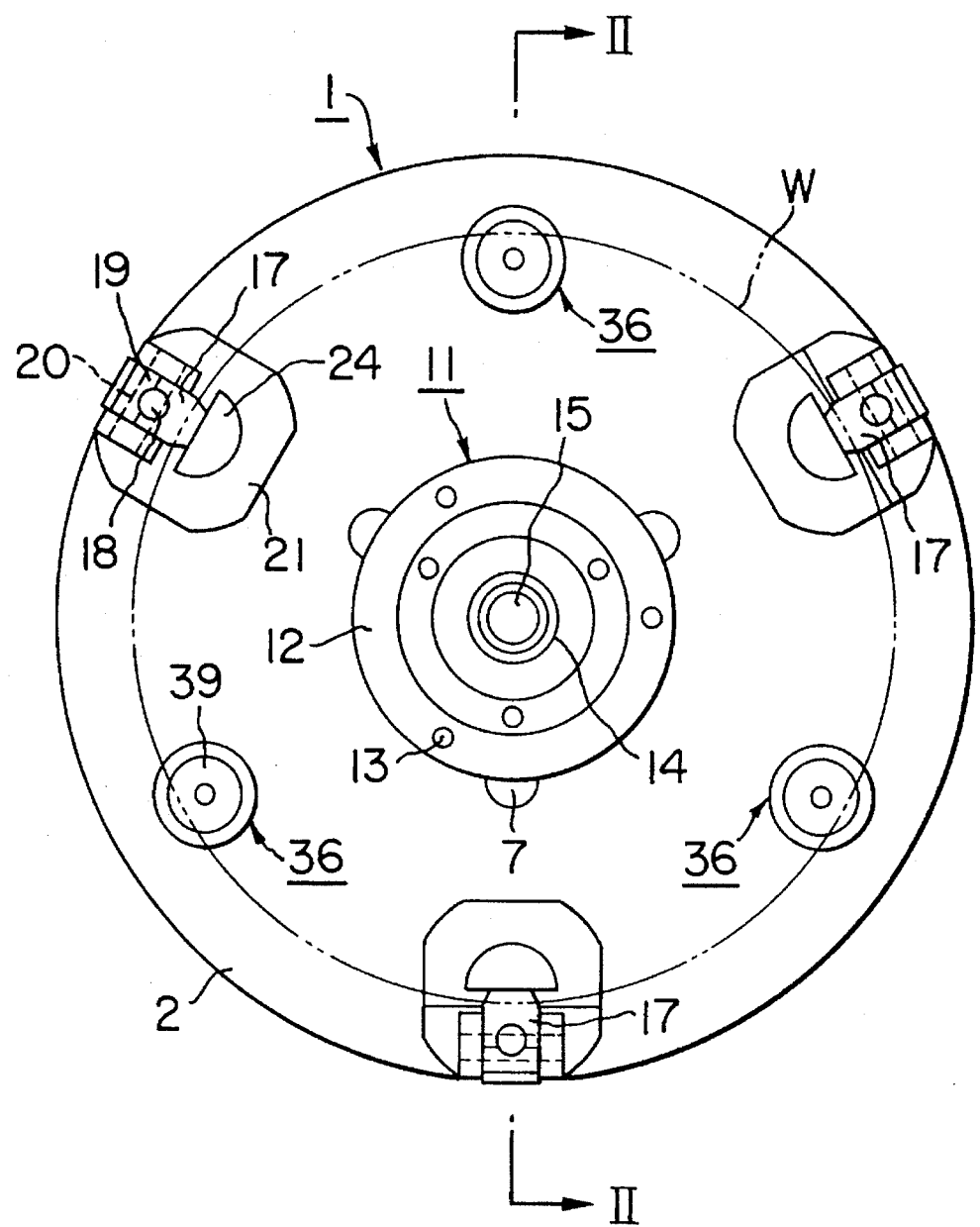
FIG. 1 is a front view showing a finger chuck according to an embodiment of the present invention.
Figure 2:
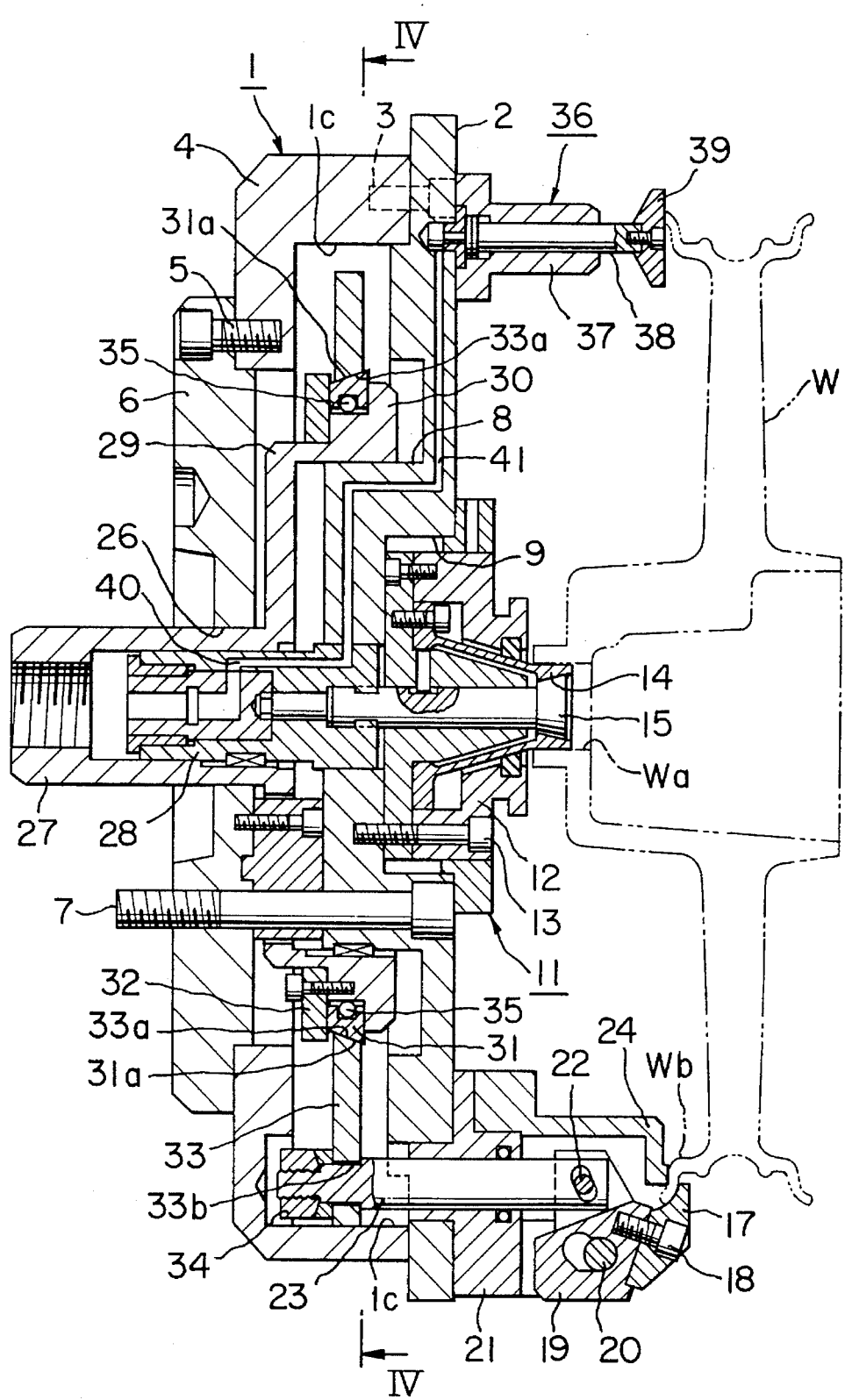
FIG. 2 is a sectional view taken along line II—II of FIG. 1.

The cavity portion 9 accommodates a rear half portion of a collet chuck type centering device 11 that fits into a center hole Wa of the workpiece W (for example, an aluminum wheel as shown in FIGS. 1 and 2). The centering device 11 places the workpiece W at the center position of the chuck main body 1. A casing 12 of the centering device 11 fits into the cavity portion 9 and is fixed to the protruding portion 8 with bolts 13. A plurality of collets are accommodated in the casing 12 of the centering device 11. A tapered rod 15 is slidably inserted into a center portion of the casing 12 in the axial direction of the chuck main body 1. As the tapered rod 15 moves forward and backward, the collets 14 are opened and closed so that the workpiece W is held or released at the center hole Wa. A plurality of jaws 17 that hold an outer peripheral edge Wb of the workpiece W is disposed at outer peripheral portions of the front wall 2. Each jaw 17 is detachably connected to a swinging member 19 with a bolt 18. In other words, a jaw 17 can be replaced with another type jaw 17 correspondingly to the type of the workpiece W. The swinging member 19 is supported by a supporting shaft 20 to a bracket 21. In addition, the swinging member 19 is connected to a rod 23 through a pin 22. A jaw member is constructed of the swinging member 19 and the jaw 17. The jaw member can be divided into a front portion and a rear portion with respect to the supporting shaft 20. The weight of the front portion of the jaw member is nearly the same as that of the second portion thereof. Thus, the chuck main body 1 that rotates at high speed is not much affected by centrifugal force. A jaw support 24 that is opposed to the jaw 17 is fixed to the bracket 21. As the rod 23 moves forward and backward in the axial direction of the chuck main body 1, the jaw 17 holds and releases the edge Wb, respectively.

A drawing member 27 pierces an axial hole 26 of the rear wall 6. A slider 28 that transmits a drive force of a spindle side actuator (not shown) to the tapered rod 15 is inserted into an opening of the drawing member 27. A disc portion 29 is formed at an inner end of the drawing member 27. The disc portion 29 extends in a space defined by the rear wall 6 and the protruding portion 8. A ring-shaped guide portion 30 extends forward integrally with the outer periphery of the disc portion 29. The guide portion 30 slidably fits on the outer periphery of the protruding portion 8. Thus, the drawing member 27 is slidably guided in the axial direction of the chuck main body 1.

A washer 31 that preferably has a spherical seat 31a on an outer periphery thereof fits on an outer periphery of the guide portion 30 through a rubber ring 35. The washer 31 is slightly slidable in the radial direction of the spherical seat 31. The washer 31 is fixed to the guide portion 30. The swinging member 19 has an angular hole 20a so as to hold the support shaft 20. Thus, when the jaw 17 releases the outer peripheral edge Wb, the jaw 17 is allowed to move outward in the radial direction. The washer 31 is prevented from slipping out by a ring-shaped plate 32. A spherical hole 33a is formed at a center portion of a spider 33. When viewed in the axial direction of the chuck main body 1, the spider 33 has a nearly triangular shape. The spherical hole 33a is inclinably and rotatably supported by the spherical seat 31a of the washer 31. A fitting hole 33b is defined at each vertex portion of the spider 33. The rod 23 is connected to the fitting hole 33b with a nut 34. The drawing member 27 is driven by the spindle side actuator (not shown) in the axial direction of the chuck main body 1 so that the jaw 17 is opened and closed through the spider 33 and the rod 23.

Figure 4:
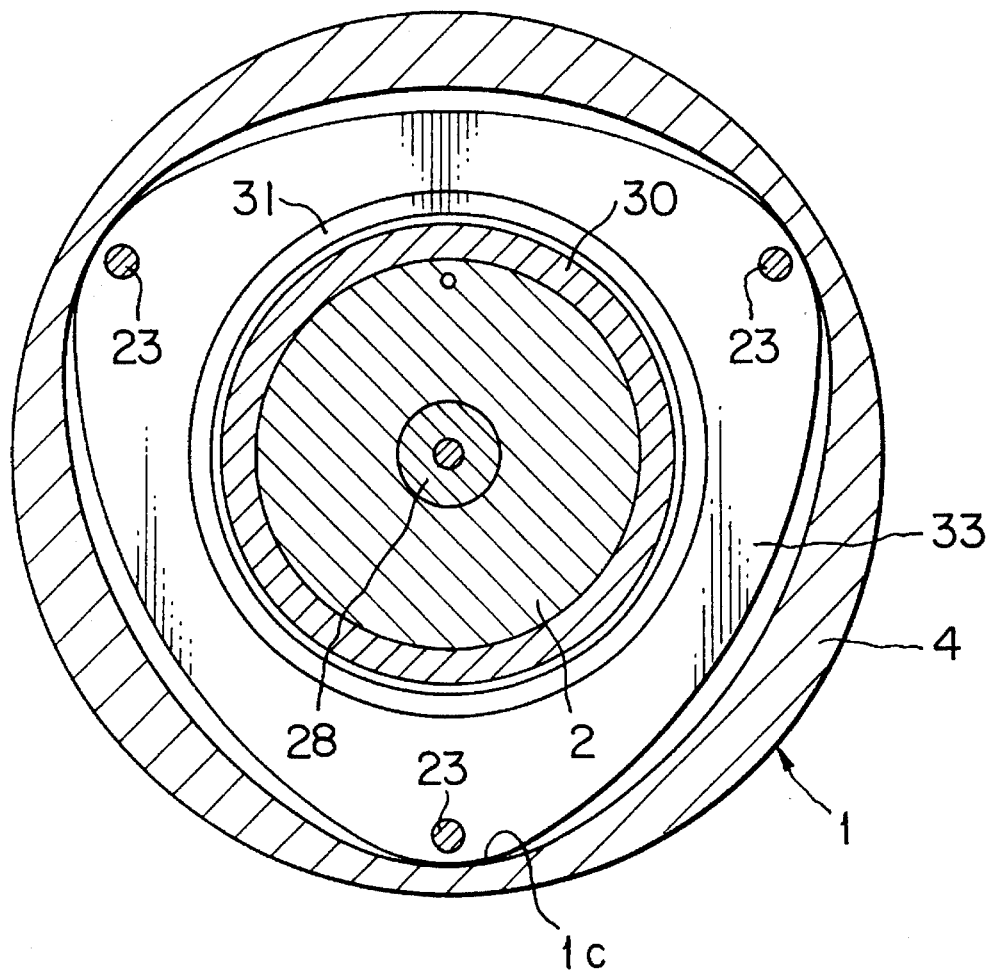
FIG. 4 is a sectional view taken along line IV—IV of FIG. 2.

As shown in FIG. 4, position limiting portions 1c that serve as position limiting means are disposed on an inner surface of the peripheral wall 4 of the chuck main body 1. The peripheral lobe portions of the triangular spider 33 is in contact with the position limiting portions 1c, respectively, so that the spider 33, even when it is inclined, is prevented from moving in radial directions. The peripheral surface of the spider 33 is formed to have a spherical shape as shown in FIG. 7.

A plurality of pusher devices 36 are disposed at outer peripheral positions of the front wall 2 other than the positions of the jaws 17. The pusher devices 36 press the edge Wb so as to prevent the outer peripheral portion of the workpiece W from vibrating. Each pusher device 36 has a cylinder 37 that accommodates a piston rod 38. A seat member 39 is disposed at a front end of the piston rod 38. Compressed air that moves the piston rod 38 is supplied from an outer air supply source to the cylinder 37 through an air passage 40 in the slider 28 and an air passage 41 in the front wall 2.

In the finger chuck according to the above-described embodiment, a rear half portion of the centering device 11 is inserted into the cavity portion 9 defined on the front wall 2 of the chuck main body 1. Thus, the distance from the front wall of the chuck main body 1 to the workpiece mounting surface is short, thereby improving the mechanical rigidity of the chuck main body 1. In addition, the ring-shaped guide portion 30 of the drawing member 27 fits on the outer periphery of the rearwardly protruding portion 8 of the front wall 2. The spherical seat 31a that supports the spider 33 is disposed on the outer periphery of the guide portion 30. Thus, the space in the vicinity of the protruding portion 8 can be effectively used so as to slide the guide portion 30 of the drawing member 27 and the spider 33 in the axial direction of the chuck main body 1. In addition, although the protruding portion 8 with the cavity portion 9 is formed, the thickness of the chuck main body 1 is relatively thin, thereby enabling compact structure of the entire finger chuck.

Next, the operation of the finger chuck for holding a workpiece will be described.

When the drawing member 27 is moved forward (rightward in FIG. 2) by a drive source such as a rotary cylinder (not shown), the spider 33 is moved to a forward end. When the spider 33 is moved to the forward end, each jaw operating rod 23 is moved forward and thereby the swinging member 19 swings. Thus, each jaw 17 opens outwardly and the distance between the jaw 17 and the jaw support 24 is enlarged. Consequently, the jaw 17 presses the workpiece W with different wall thicknesses to the jaw support 24.

When the drawing member 27 is moved backward, the spider 33 is pulled outward. Each jaw operating rod 23 therefore moves backward to its closing position. First, a jaw 17 corresponding to a thick portion of the workpiece W comes in contact therewith. As the spider 33 is further pulled outward, it is inclined corresponding to the Wall thickness of the workpiece W with which another jaw 17 comes in contact. In this manner, a compensating function of the finger chuck takes place. In other words, with the pressing force of each jaw 17, the workpiece W is held by the finger chuck.

In this condition, the spindle is rotated so that the workpiece W is rotated along with the chuck main body 1.

Figure 5:
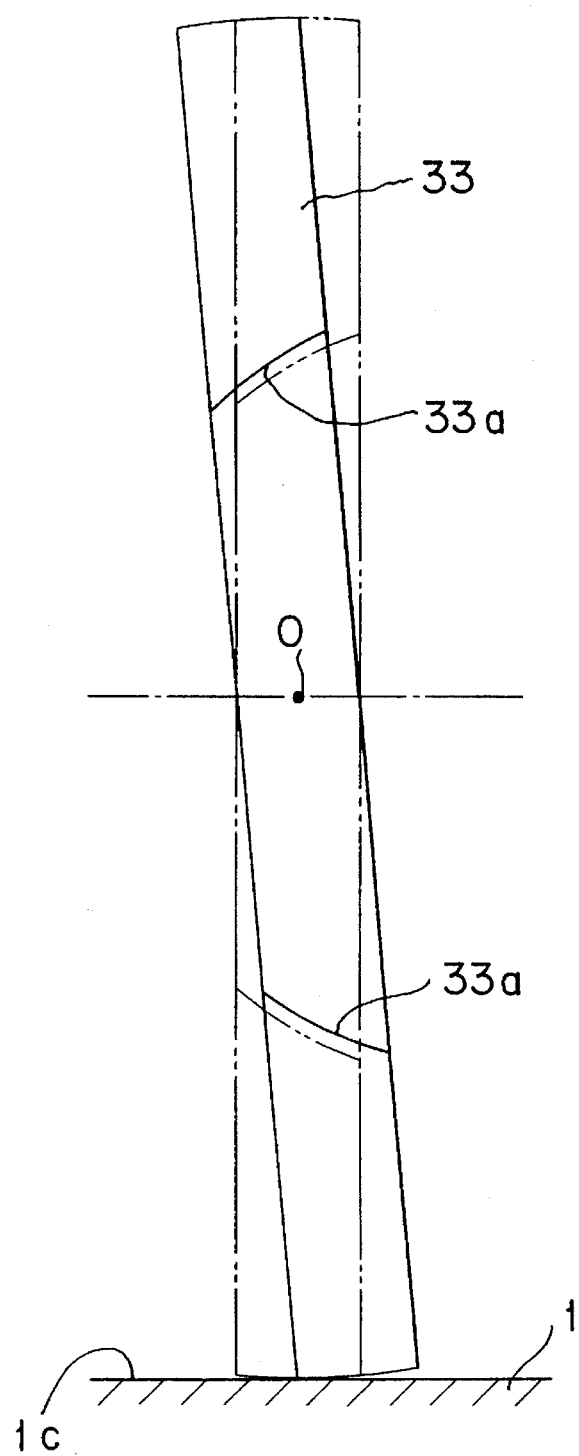
FIG. 5 is a schematic diagram for explaining an operational state of the finger chuck corresponding to the inclination of a spider.

In the meantime, as shown in FIG. 9, each spider 33 is inclined about the center $O_1$ of a spherical surface of the inner diameter thereof. The center of gravity $O_2$ of the spider 33 thereby tends to move radially by an amount X corresponding to the inclination thereof. However, as shown in FIG. 5, the peripheral surface of the spider 33 comes in contact with at least one of the position limiting portions 1c, thereby prohibiting the spider 33 from radia movement. In the meantime, while the circular plate 32 prohibits axial movement of the washer 31, the washer 31 is pressed by the inclined spider 33. Thus, the washer 31 is moved by the same amount X in the opposite direction of the spider 33. Since the center of gravity of the spider 33 does almost not move, the chuck main body 1 that rotates at high speed is well balanced. Therefore, the machining accuracy of the workpiece W can be improved and the service life of the construction parts of the finger chuck such as spindle bearings can be prolonged.

In addition, since the spider 33 can be prevented from moving radially, it is not necessary to provide a space for the amount X of the movement of the spider 33 between the fitting hole 33b of the spider 33 and the jaw operating rod 23. Thus, a washer for use on the thrust surface can be omitted.

Figure 3:
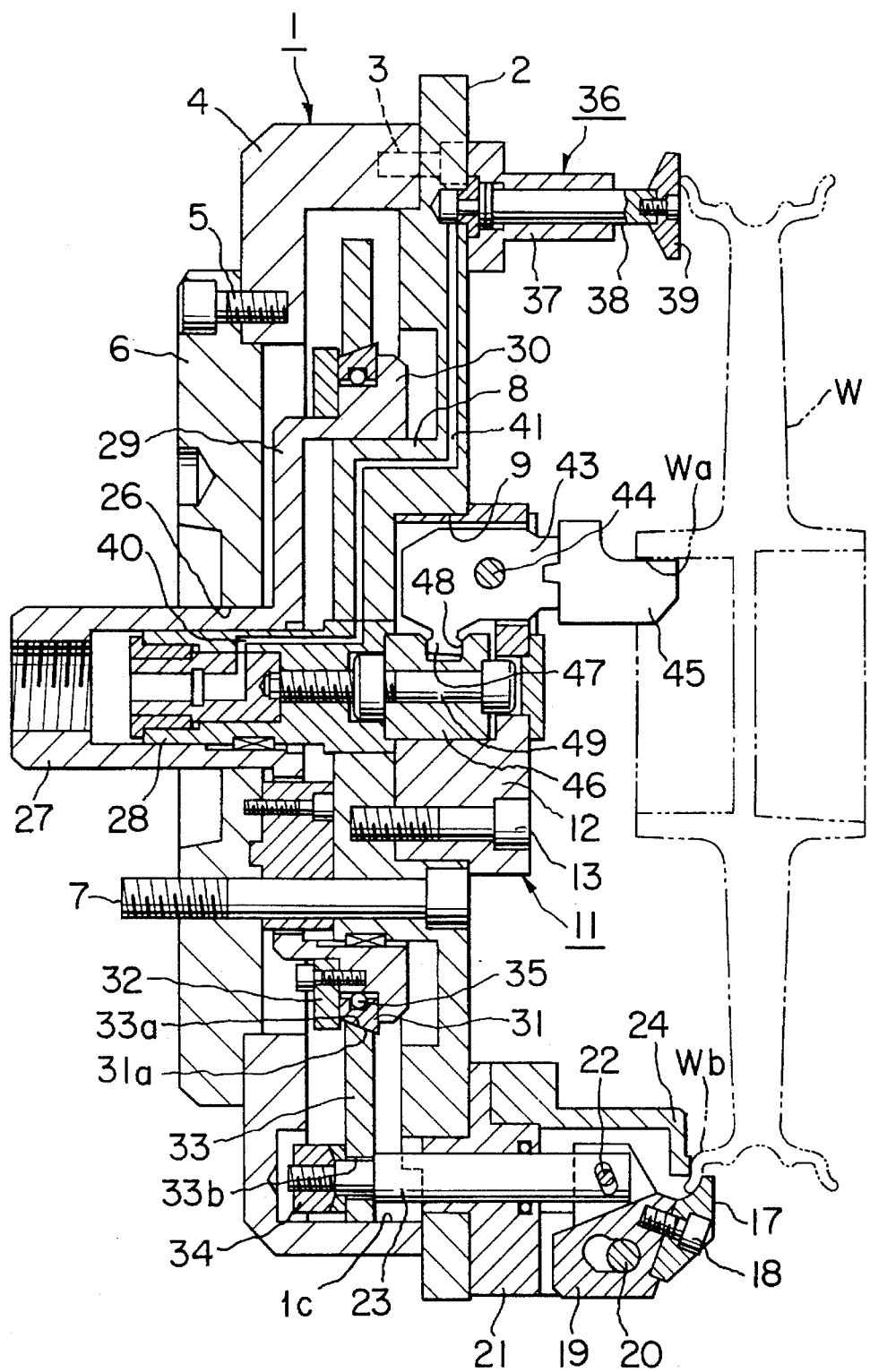
FIG. 3 is a sectional view showing a finger chuck with another example of a centering device.

In the above-described embodiment, a collet chuck type centering device 11 was exemplified. However, it should be noted that the present invention is not limited to such a device. Instead, a swinging arm type chuck as shown in FIG. 3 may be used. In this case, while a rear half portion of a casing 12 of a centering device 11 is accommodated in a cavity portion 9 of a front wall 2, the casing 12 is fixed to a protruding portion 8 with bolts 13 so as to shorten the distance from the front surface of a chuck main body to a workpiece mounting surface.

In the casing 12, a plurality of lever 43 are rockably supported by a pin 44. Each lever 43 is provided with a chuck arm 45. A sliding member 46 is accommodated in a center portion of the casing 12 so that the sliding member 46 is axially slidable. A cavity 48 that fits on a protruding portion 47 of the lever 43 is defined on an outer periphery of the sliding member 46. The sliding member 46 is connected to the slider 28 through a shouldered bolt 49. As the slider 28 is moved by a spindle side actuator in the axial direction of the chuck main body 1, the lever 43 rotates about the pin 44 through the sliding member 46, thereby opening or closing the chuck arm 45. Thus, the workpiece W is held or released at the center hole Wa.

It should be understood that the centering device used in the present invention is not limited to such a construction. Instead, a spring center that does not need a spindle side actuator may be used as the centering device.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

FIG. 6 shows a finger chuck according to another embodiment of the present invention. In this embodiment, a through-holes 33c are defined at radially intermediate positions of a spider 33. In each of the through-hole 33c, a spherical seat 50 is formed on the washer side. A stopper pin 90 is inserted into each through-hole 33c so as to prohibit the spider 33 from moving radially outward. Both the ends of the stopper pin 90 are fixed to the chuck main body 1. In this embodiment, it is clear that the same effects as the embodiment shown in FIG. 4 can be obtained.

FIG. 7 shows a finger chuck according to a further embodiment of the present invention.

In this embodiment, a spherical seat 27a is formed on a drawing member 27. A spherical hole 31a in a washer 31 is fully brought into contact with the spherical seat 27a. An annular groove 31b is defined on the periphery of the washer 31. A peripheral protruding portion 33b of a spider 33 fits into the groove 31b through a rubber ring 35 so that the protruding portion 33b can move radially. A ring-shaped plate 32 that prohibits the washer 31 from moving axially is fixed to the drawing member 27.

As has been described above, according to the present invention, since the front wall of the chuck main body has the cavity portion that accommodates the centering device, the distance from the front surface of the chuck main body to the workpiece mounting surface can be shortened and the mechanical rigidity of the chuck main body can be improved. In addition, since the spider is supported on the outer periphery of the guide portion through the spherical seat, the space in the vicinity of the protruding portion can be effectively used, thereby decreasing, the thickness of the chuck main body.

Moreover, according to the present invention, when the spider is inclined for a compensating function, the spider can be prohibited from moving radially, thereby reducing the fluctuation of the center of gravity of the spider. Thus, the rotation stability of the chuck main body that rotates at high speed can be improved, thereby improving the machining accuracy of workpieces and preventing shortening of the service lives of constructional parts. Furthermore, since the washer is disposed between the outer peripheral surface of the drawing member and the inner peripheral surface of the spider, the washer does not protrude from the spider. Thus, even if a finger chuck uses a washer, the axial length of the chuck can be effectively reduced.

What is claimed is:

1. A finger chuck for use with a machine tool, comprising:
   a chuck main body having a front wall and a rear wall, said front wall being opposed to a workpiece, said rear wall being opposed to said front wall, said front wall and said rear wall defining a space therebetween;
   centering means supported by said front wall and connected to a center portion of said workpiece, for centering said workpiece on an axis of said chuck main body;
   a plurality of jaw means supported by said front wall for holding an outer peripheral portion of said workpiece;
   rearwardly protruding means protruding from a center portion of said front wall toward said rear wall within said space;
   cavity means defined in said rearwardly protruding means and having an opening on a front surface of said front wall, said cavity means accommodating at least part of said centering means so as to hold said centering means;
   drawing means piercing said rear wall in the axial direction of said chuck main body, said drawing means comprising a disc portion provided transverse to an axial line of said chuck main body in said space and being shiftable by a drive source in the axial direction of said chuck main body;
   guide means extending from said disc portion in said space and provided integrally with said drawing means, said guide means being guided by said rearwardly protruding means in the axial direction of said chuck mean body;
   means forming a seat surface in the vicinity of said guide means;
   spider means supported outside said guide means for movement along said seat surface; and
   coupling means for coupling said spider means and said jaw means so as to convert the movement of said spider means caused by said drawing means into open and close motions of said jaw means.

2. The finger chuck as set forth in claim 1, wherein said protruding means has a cylindrical surface provided around an axial line of said chuck main body, and wherein said guide means is formed in an annular shape.

3. The finger chuck as set forth in claim 2, wherein said cavity means is a cylindrical hole concentric with said protruding means.

4. The finger chuck as set forth in claim 1, wherein said seat surface is spherical.

5. The finger chuck as set forth in claim 1, further comprising:
   a slider disposed in said drawing means for operating said centering means.

6. The finger chuck as set forth in claim 1,
   wherein said centering means is a collet chuck.

7. The finger chuck as set forth in claim 1,
   wherein said centering means is a swinging arm type chuck.

8. A finger chuck for use with a machine tool, comprising:
   a chuck main body having a front wall and a rear wall, said front wall being opposed to a workpiece, said rear wall being opposed to said front wall, said front wall and said rear wall defining a space therebetween;
   centering means supported by said front wall and connected to a center portion of said workpiece, for centering said workpiece on an axis of said chuck main body;
   a plurality of jaw means supported by said front wall for holding an outer peripheral portion of said workpiece;
   rearwardly protruding means protruding from a center portion of said front wall toward said rear wall within said space;
   cavity means defined in said rearwardly protruding means and having an opening on a front surface of said front wall, said cavity means accommodating at least part of said centering means so as to hold said centering means;
   drawing means piercing said rear wall in the axial direction of said chuck main body, said drawing means being shiftable by a drive source in the axial direction of said chuck main body;
   guide means disposed in said space and provided integrally with said drawing means, said guide means being guided by said rearwardly protruding means in the axial direction of said chuck main body;

means forming a seat surface in the vicinity of said guide means, said seat surface comprising an outer peripheral surface of a ring-shaped washer disposed around said guide means;

spider means supported outside said guide means for movement along said seat surface; and coupling means for coupling said spider means and said jaw means so as to convert the movement of said spider means caused by said drawing means into open and close motions of said jaw means.

9. The finger chuck as set forth in claim 8, further comprising:

limiting means for prohibiting said ring-shaped washer from moving relative to said guide means in the axial direction of said chuck main body.

10. The finger chuck as set forth in claim 8, further comprising:

elastic means disposed between said washer and said guide means.

11. The finger chuck as set forth in claim 8, wherein said seat surface forming means is a surface formed on an outer periphery of said guide means, and wherein said ring-shaped washer is disposed between said surface and said spider means.

12. The finger chuck as set forth in claim 10, further comprising:

elastic means disposed between said ring-shaped washer and said spider means.

13. The finger chuck as set forth in claim 11, further comprising:

limiting means for prohibiting said ring-shaped washer from moving relative to said guide means in the axial direction of said chuck main body.

14. A finger chuck for use with a machine tool, comprising:

a chuck main body having a front wall and a rear wall, said front wall being opposed to a workpiece, said rear wall being opposed to said front wall, said front wall and said rear wall defining a space therebetween;

centering means supported by said front wall and connected to a center portion of said workpiece, for centering said workpiece on an axis of said chuck main body;

a plurality of jaw means supported by said front wall for holding an outer peripheral portion of said workpiece;

rearwardly protruding means protruding from a center portion of said front wall toward said rear wall within said space;

cavity means defined in said rearwardly protruding means and having an opening on a front surface of said front wall, said cavity means accommodating at least part of said centering means so as to hold said centering means;

drawing means piercing said rear wall in the axial direction of said chuck main body, said drawing means being shiftable by a drive source in the axial direction of said chuck main body;

guide means disposed in said space and provided integrally with said drawing means, said guide means being guided by said rearwardly protruding means in the axial direction of said chuck main body;

means forming a seat surface in the vicinity of said guide means;

spider means supported outside said guide means for movement along said seat surface;

coupling means for coupling said spider means and said jaw means so as to convert the movement of said spider means caused by said drawing means into open and close motions of said jaw means; and radial direction limiting means for prohibiting said spider means from moving in radial directions thereof.

15. The finger chuck as set forth in claim 14, wherein said radial direction limiting means is disposed on an inner peripheral surface of said chuck main body.

16. The finger chuck as set forth in claim 14, wherein said radial direction limiting means comprises:

an opening with a spherical seat disposed on said spider means; and a stopper pin fixed to said chuck main body, said stopper pin extending through said opening.

* * * * *